July 17, 1928.

F. S. KOCHENDORFER 1,677,186

STRAND WORKING MECHANISM

Filed Feb. 4, 1925

Inventor
Frederic S. Kochendorfer
by H. A. Patton Atty.

July 17, 1928.

F. S. KOCHENDORFER 1,677,186

STRAND WORKING MECHANISM

Filed Feb. 4, 1925  6 Sheets-Sheet 4

Inventor
Frederic S. Kochendorfer
by
Atty.

July 17, 1928.  
F. S. KOCHENDORFER  
STRAND WORKING MECHANISM  
Filed Feb. 4, 1925

Inventor  
Frederic S. Kochendorfer  
by  *Atty.*

July 17, 1928.　　　　　　　　　　　　　　　1,677,186
F. S. KOCHENDORFER
STRAND WORKING MECHANISM
Filed Feb. 4, 1925　　　6 Sheets-Sheet 6

Inventor
Frederic S. Kochendorfer
by H. A. Gattuso
Atty.

Patented July 17, 1928.

1,677,186

UNITED STATES PATENT OFFICE.

FREDERIC SHIELDS KOCHENDORFER, OF RIVER FOREST, ILLINOIS, ASSIGNOR TO WESTERN ELECTRIC COMPANY, INCORPORATED, OF NEW YORK, N. Y., A CORPORATION OF NEW YORK.

STRAND-WORKING MECHANISM.

Application filed February 4, 1925. Serial No. 6,912.

This invention relates to strand working mechanisms, and more particularly to an apparatus for severing a strand into lengths.

The primary object of this invention is to provide an efficient and accurate strand severing apparatus which is readily adjustable to produce widely differing lengths of strands and which simultaneously counts and collects the severed strands.

Other objects and advantages of the invention will become apparent in the following detailed description and the novel features of the invention will be particularly pointed out in the appended claims.

In accordance with the general features and objects of one embodiment of the invention, there is provided a capstan which is adapted to withdraw a plurality of strands from a plurality of supply sources and push them onto a horizontal surface of a multi-sided drum. The strands are pushed along the surface of the drum by a continuously moving belt until their forward ends engage an adjustably positioned electrical contact member causing a solenoid actuated positively driven cutting mechanism to move in the same direction and at the same speed as the moving strands and also at right angles thereto to sever them. A partial rotation of the drum discharges the severed strands into a collecting apron and presents another surface for the succeeding strands. The collecting apron, upon receiving a certain number of strands as determined by an adjustable electrically controlled counter, discharges them into a bundling apron wherein they may be tied together in bundles of any convenient size. The counter may be rendered ineffective while cutting off the ends of the strands evenly before starting the machine in operation. Means is provided for automatically stopping the machine when a knot or other obstruction appears in any of the strands.

Although the invention is herein illustrated and described in connection with an apparatus for simultaneously severing a plurality of strands into predetermined lengths, it should be understood that the novel features and advantages of the invention are capable of other applications and should be limited only by the scope of the appended claims.

In the accompanying drawings which illustrate one specific embodiment of the invention.

Referring now to the drawings in detail, wherein like reference characters designate like parts throughout the several views, 15 is a main supporting frame or housing which is suitably secured to the top of a bench or table 16. A main driving shaft 17 is rotatably journaled in bearings 18 and 19 formed in the frame 15 and a supporting bracket 20, respectively, and is driven by any suitable source of power (not shown). A capstan 23 is secured to the shaft 17 and has formed in its periphery a plurality of annular grooves 24, 24 (Figs. 3 and 8) which serve to properly space and guide a plurality of strands 25, 25 drawn from a plurality of supply sources (not shown). Rotatably journaled in suitable bearings hinged to the frame 15 are a plurality of spring compressed rollers 26, 26 which press the moving strands against the bottoms of the grooves 24, thereby reducing the slippage thereof to a minimum.

The strands 25 are pushed by the capstan 23 through a guide channel 28 onto one of a plurality of surfaces 29, 29 of a multi-sided drum 30, which is secured to a horizontal shaft 31. The shaft 31 is rotatably journaled in bearings 32 and 33 formed at one end of arms 34 and 35, respectively, which arms are pivoted at their other ends on stud shafts 36 and 37, respectively, supported by standards 38 and 39, respectively. Positioned immediately above the drum 30 and engaging the top surface 29 thereof is a flexible belt 40 which serves to move the strands along the upper surface 29 of the drum 30. A plurality of diagonally disposed depressions 240 (Fig. 2) are provided on the outer surface of the belt 40 and serve to prevent the moving strands from leaving the surface of the drum. As soon as the forward ends of any of the strands start to leave the surface 29 of the drum 30, they are caught in the depressions 240 of the belt 40 and are pushed along with the other strands thereby preventing curling or entangling of the strands. When the machine is in operation, the belt 40 is continuously driven over pulleys 41 and 42 secured to shafts 43 and 44, respectively. The shaft 43 is rotatably journaled in bearings 45 and 46 formed in the standard 38 and is driven from the main shaft 17 through mechanism to be hereinafter described. The shaft 44 is rotatably journaled in bearings 47 and 48 which are adjustably supported in horizontal slots 49, 49 (Fig. 1) formed in the standard 39 in order to compensate for variations in the length of the belt 40.

Figure 2:
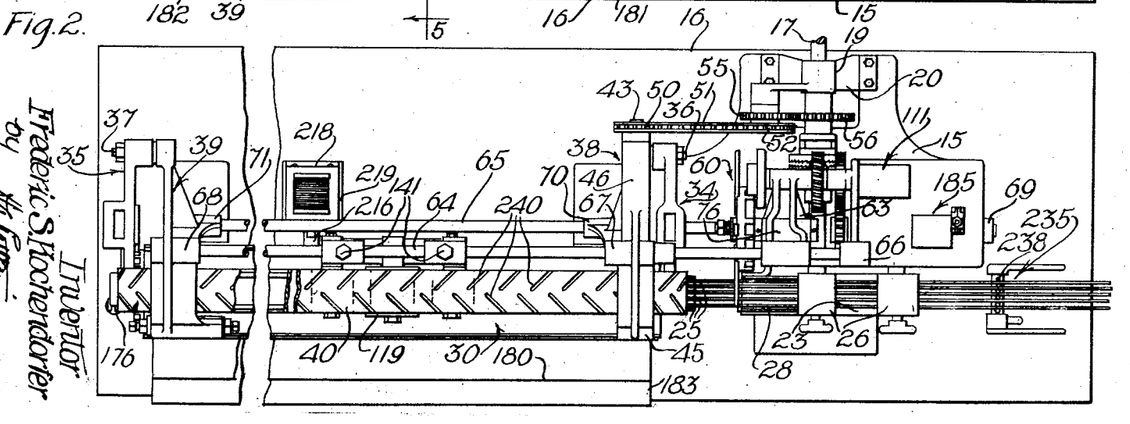
Fig. 2 is a plan view thereof.
Figure 3:
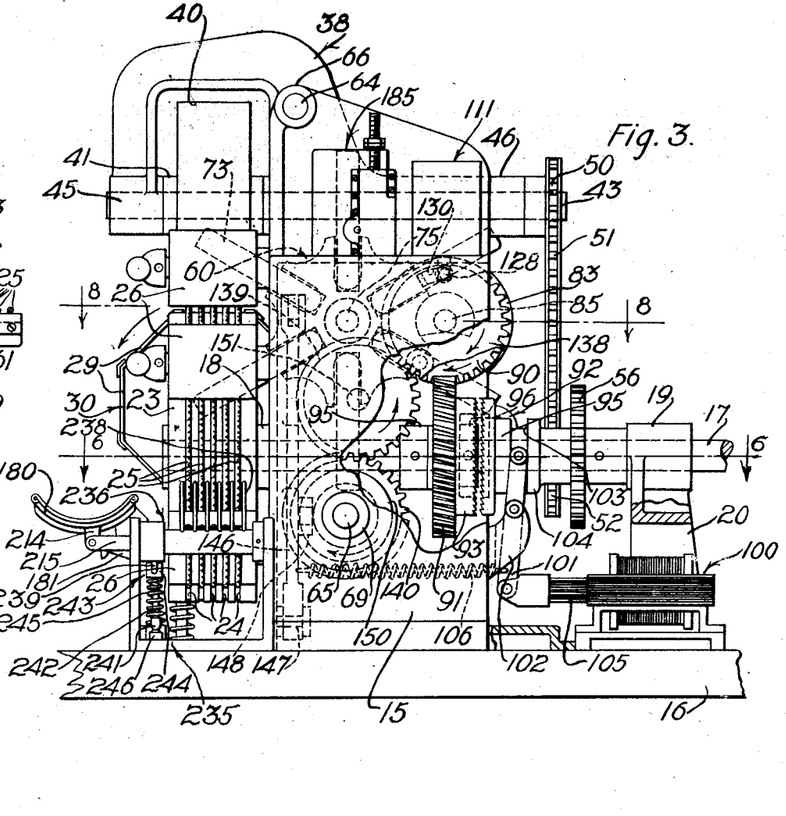
Fig. 3 is an enlarged end view, partly in section, of the apparatus shown in Figs. 1 and 2.
Figures 4, 11:
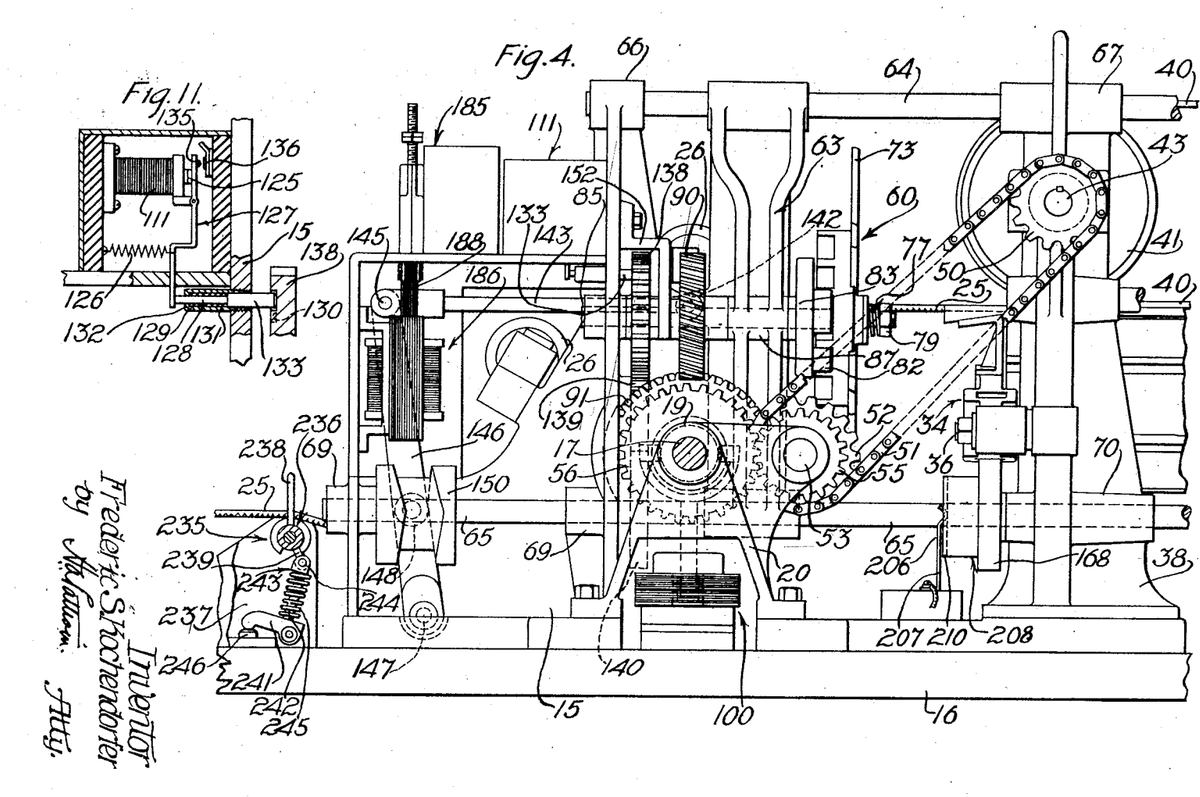
Fig. 4 is an enlarged rear elevation of a portion of the improved apparatus.
Fig. 11 is an enlarged fragmentary detail view showing the mechanism for controlling the operation of the clutch which actuates the cutter and drum indexing mechanism.
Figure 6:
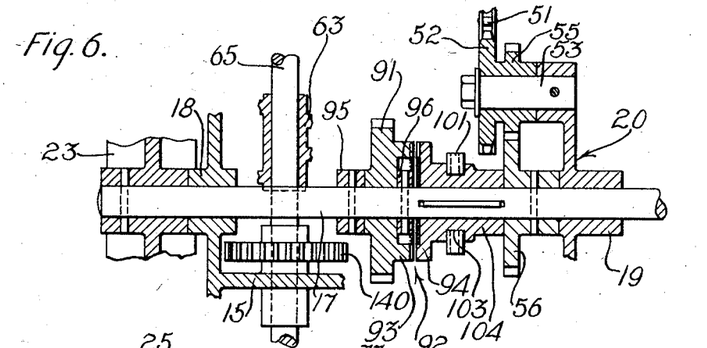
Fig. 6 is a fragmentary plan section taken on the line 6—6 of Fig. 3.

Referring to Figs. 2 and 3, it will be noted that the shaft 43 projects slightly beyond the bearing 44 and has keyed thereto a sprocket 50 which is driven by a sprocket chain 51 from a sprocket 52 rotatably mounted on a stationary stud shaft 53 (Figs. 4 and 6). Formed integral with the sprocket 52 is a gear 55 which meshes with a gear 56 keyed to the shaft 17.

Figure 7:
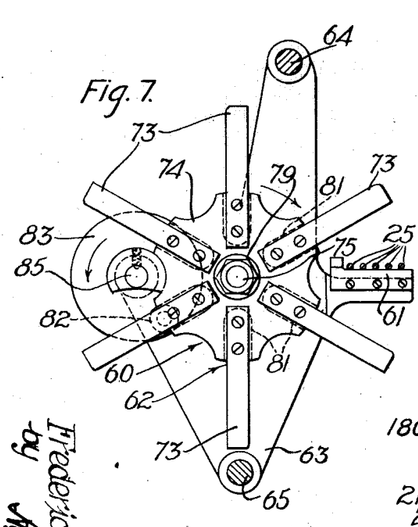
Fig. 7 is an enlarged detail view of the cutting mechanism.
Figures 8, 12, 13, 14:
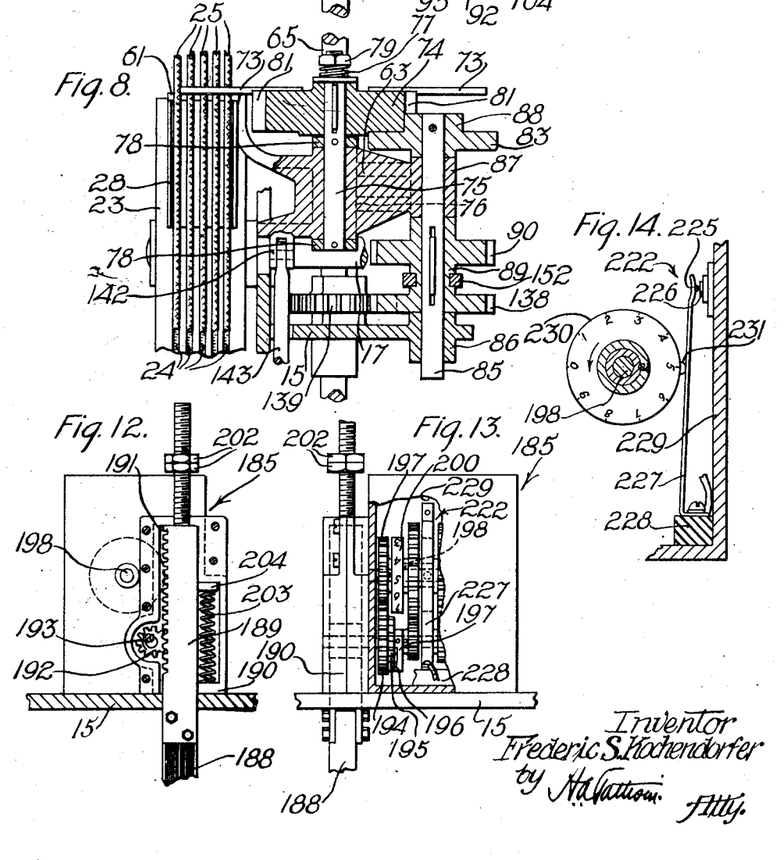
Fig. 8 is a fragmentary detail section taken on the line 8—8 of Fig. 3.
Figs. 12, 13, and 14 are enlarged fragmentary detail views of portions of the counting mechanism.

Positioned between the capstan 23 and the forward end of the drum 30 is a cutting mechanism 60 which comprises a stationary cutting blade 61 and a revolvable cutter 62 (Figs. 7 and 8). The stationary blade 61 is secured to a carriage member 63 which is reciprocably mounted on horizontal shafts 64 and 65. The shaft 64 is rigidly supported in bearings 66, 67, and 68 formed at the top of the frame 15 and the standards 38 and 39, respectively, and the shaft 65 is rotatably supported in bearings 69, 70, and 71 formed near the bottom of the frame 15 and the standards 38 and 39, respectively.

Referring to Figs. 7 and 8, it will be noted that the revolvable cutter 62 comprises a plurality of radially disposed knives 73, 73 which are rigidly fastened to a hub member 74. The member 74 is keyed to a shaft 75 which is rotatably journaled in a bearing 76 formed in the carriage member 63. The shaft 75 is held against longitudinal displacement in the bearing 76 by collars 78, 78 secured to the shaft on either side of the bearing. An adjusting nut 79 threaded at the end of the shaft 75 serves as a means for longitudinally adjusting the revolvable cutter 62 relative to the stationary cutter 61. Encircling the shaft 75 and interposed between the hub member 74 and the adjusting nut 79 is a compression spring 77 which tends to urge the revolvable cutter against the stationary cutter during the cutting operation to provide the necessary cutting action.

In the present embodiment of the invention the revolvable cutter 62 is provided with six cutting knives and is rotated through one-sixth of a revolution during each cutting operation, each time causing one of the knives to cooperate with the stationary cutter 61 to sever the moving strands. At the same time, in order to insure that the severed strands will be of uniform length, the entire cutting mechanism is moved horizontally on the shafts 64 and 65 in the same direction and at the same speed as the strands 25 through mechanism to be hereinafter described.

The mechanism for rotating the cutter 62 is a well known form of the Geneva drive and will therefore be described herein very briefly. The hub member 74 of the cutter 62 is provided with six circumferential notches 81, 81 each of which is adapted to be engaged by a roller 82 rotatably mounted near the periphery of a disk member 83 (Fig. 7). The member 83 is keyed to a shaft 85 which is rotatably and slidably journaled in bearings 86 and 87 formed in the frame 15 and carriage member 63, respectively, (Fig. 8). A cam 88 surrounding the shaft 85 and formed integral with the disk member 83 serves to properly time the movements of the hub member 74 and the disk member 83 to insure that at each revolution of the member 83, the roller 82 will engage the next notch 81 of the member 74. Slidably keyed to the shaft 85 is a sleeve 89 near one end of which is formed a spiral gear 90 which meshes with a spiral gear 91 (Figs. 3 and 4) formed integral with the driven member 93 of a clutch 92 mounted on the main shaft 17. The clutch member 93 is rotatably journaled on the shaft 17 and is held against longitudinal displacement thereon by collars 95 and 96. A driving member 94 of the clutch 92 is slidably keyed to the shaft 17 and is moved into operative engagment with the clutch member 93 by means of a solenoid 100 through a lever 101 which is pivotally supported intermediate its ends in a bracket 102 suitably secured to the frame 15 (Fig. 3). The upper end of the lever 101 is bifurcated and engages an annular groove 103 formed in a collar 104 which is integral with the clutch member 94. The lower end of the lever 101 is pivotally connected to the end of a plunger 105 of the solenoid 100. A tension spring 106 having one end fastened near the lower end of the lever 101 and its other end fastened at 108 to the frame 15 serves to normally maintain the clutch 92 in an inoperative position by maintaining the driving member 93 thereof disengaged from the driven member 94.

Figure 1:
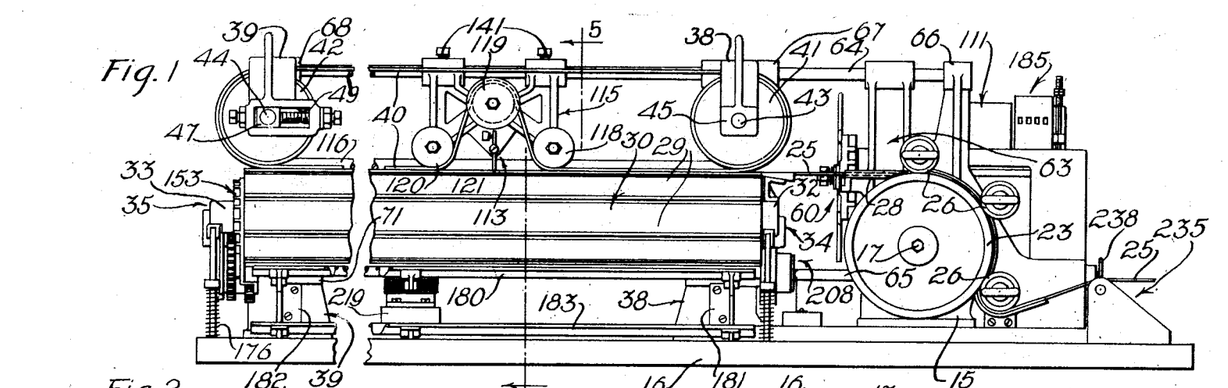
Fig. 1 is a front elevation of a strand severing apparatus embodying the features of the present invention.
Figure 16:
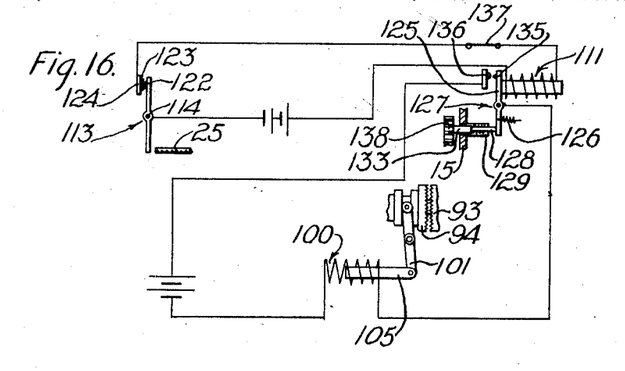
Fig. 16 shows an electrical circuit for controlling the actuation of the solenoid for operating the clutch which actuates the cutting and drum indexing mechanism.

The solenoid 100 is connected in an electric circuit 110 which is controlled by a relay 111 (Fig. 16). The relay 111 is connected in a circuit 112 which circuit is controlled by a pivoted member 113 adjustably positioned immediately above the drum 30 and in the path of the moving strands (Figs 1 and 16). The member 113 is pivotally supported by a pin 114 secured to a carier 115 which is slidably supported on the shaft 64 and a horizontal bar 116, the bar 116 being rigidly connected to the standards 38 and 39. Rotatably journaled in suitable bearings formed in the carrier 115 are three pulleys 118, 119, and 120, the pulley 118 being positioned above and intermediate the pulleys 118 and 120. The belt 40 rides under the pulley 118, over the top of the pulley 119 and under the pulley 120, thereby providing a suitable open space 121 (Fig. 1) on the upper surface of the drum 30 within which space the pivoted member 113 is actuated by the forward ends of the moving strands, as will hereinafter be described.

Figure 5:
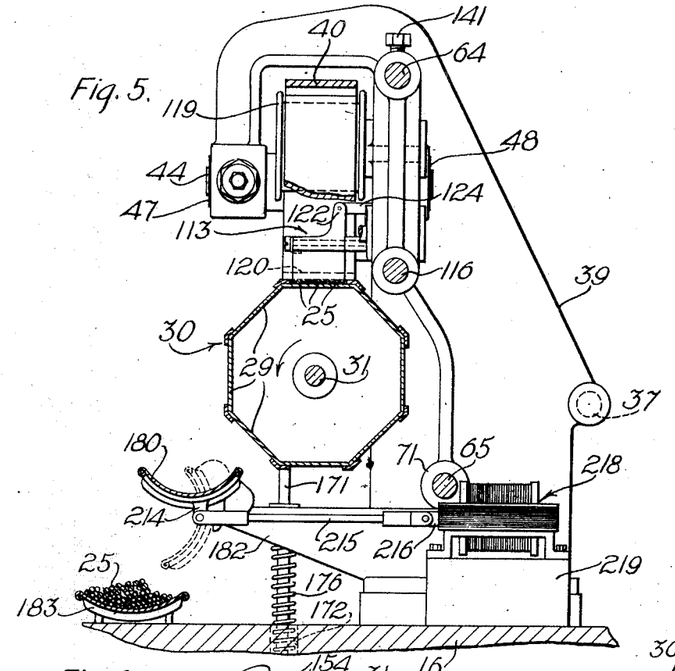
Fig. 5 is an enlarged fragmentary vertical section taken on the line line 5—5 of Fig. 1 showing the mechanism for tripping the collecting apron.

Referring to Figs. 1 and 5 it will be noted that the lower end of the member 113 just clears the top surface of the drum 30 and extends across the entire width thereof, thereby insuring that some part of it will be engaged by the forward ends of the moving strands. Carried at the upper end of the member 113 is a metal contact member 122 which normally engages a second contact member 123 which is supported by an insulating member 124 suitably secured to the carrier 115. As indicated in Fig. 16, the contact members 122 and 123 serve to open and close the circuit 112 to actuate the relay 111. Since the circuit 112 is normally closed, the relay 111 normally attracts its armature 125 against the tension of a spring 126 (Fig. 11). The relay armature 125 is formed at the upper end of a pivoted member 127 whose lower end engages one end of a pin 128 which is resiliently mounted in a bushing 129 threaded into the frame 15. The opposite end of the pin 128 normally engages a groove 130 formed in the face of a gear 138 which is formed integral with the sleeve 89. A compression spring 131, surrounding the pin 128 and interposed between a shoulder 132 in the bushing 129 and an enlarged portion 133 of the pin 128, serves to normally hold the pin 128 within the groove 130 of the gear 138 to prevent rotation thereof (Fig. 11).

Mounted at the upper end of the member 127 is an electrical contact member 135 which is positioned to engage a similar contact member 136 when the member 127 is moved in a clockwise direction. The contact members 135 and 136 serve to open and close the circuit 110 to actuate the solenoid 100 which controls the operation of the cutting mechanism.

It is apparent that upon the forward ends of the moving strands engaging the lower end of the member 113, the contact 122 is disengaged from the contact 123 and the circuit 112 is opened, thereby releasing the relay 111. The tension spring 126 causes the member 127 to move in a clockwise direction thereby closing the contacts 135 and 136 in the circuit 110, and actuating the solenoid 100 which operates the cutting mechanism to sever the moving strands. A switch 137 connected in the relay circuit 112 and positioned within convenient reach of the operator serves as a means for opening that circuit to operate the cutting mechanism to cut off the ends of the strands evenly before starting the machine into operation. The length of the severed strands is determined by the distance between the cutting mechanism and the member 113 and may therefore be varied by moving the carrier 115 towards or away from the cutting mechanism 60. A pair of hand screws 141, 141 threaded through the carrier 115 and engaging the shaft 64 serve to fasten the carrier 115 to the shaft 64 at any predetermined distance from the cutting mechanism.

The mechanism for reciprocating the cutting mechanism 60 simultaneously with each cutting operation will now be described: Pivoted at one end to a lug 142 (Fig. 4) formed integral with the carriage member 63 is a horizontally disposed link 143, the other end of which is pivoted at 145 to the upper end of an arm 146 which is pivoted at its lower end on a pin 147 secured near the bottom of the frame 15. Rotatably carried by the arm 146 intermediate its end is a roller 148 which constantly engages a barrel type cam 150 (Fig.

4). which cam is secured to and rotatable with the shaft 65. The contour of the surface of the cam 150 is such that a rotation thereof through the shaft 65 causes a horizontal reciprocating movement of the roller 148, which movement is transmitted to the cutting mechanism 60 through the link 143.

The shaft 65 may be driven by any suitable source of power and in the present embodiment of the invention, it is driven from the shaft 85 through a train of gears 138, 139, and 140 (Figs. 3 and 8). The gear 138 is secured to or formed integral with the sleeve 89 and meshes with the gear 139 which is keyed to a stud shaft 151 rotatably journaled in a suitable bearing formed in the frame 15. The sleeve 89 is held against longitudinal displacement by a bifurcated bracket 152 secured to the frame 15 (Fig. 4). The gear 139, in turn, meshes with the gear 140 which gear is keyed to the shaft 65. From the construction described above, it is apparent that the horizontal movement of the cutting mechanism 60 is simultaneous with the rotation of the cutter 62 since both of these movements are controlled by the shaft 85.

Immediately after each cutting operation the drum 30 is rotated sufficiently to discharge the several strands from the upper surface 29 of the drum 30 and present the next adjacent surface 29 for the succeeding strands. In the present embodiment of the invention the drum 30 is provided with eight horizontal surfaces and is therefore rotated one-eighth of a revolution after each cutting operation. In order to facilitate the discharge of the severed strands the drum 30 is simultaneously lowered slightly below the lower span of the belt 40 by mechanism to be hereinafter described.

The mechanism for rotating the drum 30 is similar to the mechanism employed for rotating the cutter 62 and will therefore be described only generally. Secured at the end of the drum shaft 31 is an annular disk member 153 (Fig. 9) which is provided with eight circumferential notches 154, 154, each of which is adapted to be engaged by a roller 155 rotatably mounted on the face of a gear 156. The gear 156 is keyed to a stud shaft 157 and meshes with a double gear 158 which is idly mounted on a stud shaft 160. The stud shafts 157 and 160 are journaled in suitable bearings formed in brackets 161 and 162 (Fig. 10) mounted on either side of the arm 35. A gear 164 keyed to the shaft 65 meshes with the idle gear 158 to drive the gear 156. Formed integral with the gear 156 and surrounding the shaft 157 is a cam 165 which serves to properly time the movements of the member 153 and gear 156 to insure that at each revolution of the gear 156 the roller 155 will engage the next notch 154 of the member 153. It should be noted that the gears 138, 139, and 140 are each provided with the same number of teeth and that the shaft 65 is therefore rotated at the same rate of speed as the shaft 85. Also, since the gears 156 and 164 are of the same size, it is apparent that the shaft 157 is rotated at the same speed as the shaft 85, and that during each revolution of the shaft 85 the drum 30 is rotated through one-eighth of a revolution.

The mechanism for lowering the drum 30 simultaneously with each partial rotation thereof will now be described. Rotatably journaled in suitable bearings formed in each of the arms 41 and 42 intermediate their ends is a roller 167 each of which constantly rests upon the periphery of a cam 168. The cams 168 are secured to the shaft 65 and are substantially circular, except for a small cut-away portion indicated at 169 in Fig. 9. It is apparent that upon the rollers 167 engaging the cut-away portions 169 of the cams 168, the drum 30 will lower slightly of its own weight and will remain lowered until the circular portions of the cams are again engaged by the rollers 167.

Figure 9:
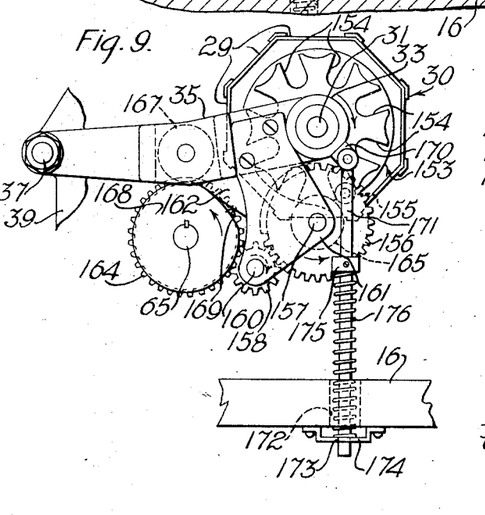
Figs. 9 and 10 are enlarged fragmentary detail views of the drum indexing mechanism.
Figure 10:
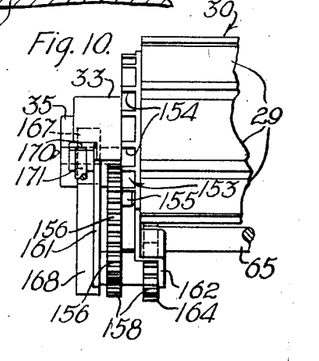

Pivotally connected, at one end, to a lug 170 formed at the free end of each of the arms 32 and 33 is a vertically disposed bar 171 whose other end protrudes through an aperture 172 in the bench 16 and through an aperture 173 in a bracket 174 fastened underneath the bench (Fig. 9). Encircling the bar 171 and interposed between the bracket 174 and a collar 175 is a compression spring 176 which serves as a shock absorber for the drum 30 during its downward movement. The tension of the spring 176 may be varied by moving the collar 175 along the bar 171.

At each rotation of the drum 30, the severed strands are discharged into a collecting apron 180 which is positioned in front of and immediately below the drum (Fig. 5). The collecting apron 180 is pivotally supported by brackets 181 and 182, which brackets are rigidly secured to the supporting standards 38 and 39, respectively. Upon receiving a predetermined number of strands, the collecting apron is tripped by mechanism to be hereinafter described, and the strands are discharged into a second apron 183 which may be suitably secured to the top of the bench 16.

Figure 17:
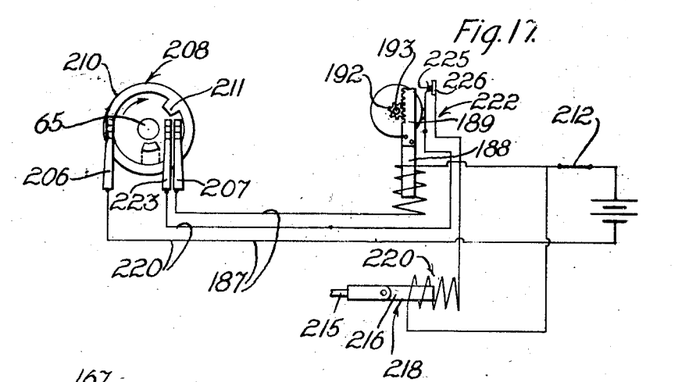
Fig. 17 shows an electrical circuit for controlling the actuation of the solenoids which operate the counter and trip the collecting apron.

An adjustable electrically controlled counting mechanism 185 is provided for counting the severed strands as they are discharged from the drum and received by the collecting apron 180. The counting mechanism 185 is operated by a solenoid 186 (Fig. 4) which is actuated by an electrical circuit 187 (Fig. 17). The plunger 188 of the solenoid 186 is pivotally connected to a vertically disposed bar 189 which is reciprocably mounted in a bearing 190 suitably supported by the frame 15 (Figs. 12 and 13). Formed on one side of the bar 189 are a plurality of teeth 191, 191 which mesh with the teeth of a pinion 192. The pinion 192 is secured to a shaft 193 on which is rotatably mounted a gear 194 which drives the counting mechanism. Secured to the face of the gear 194 is a ratchet 195 (Fig. 13) over the teeth of which rides a spring compressed pawl 196 which is pivotally carried at the end of a lever 197 secured to the shaft 193. Through the pawl and ratchet arrangement just described, the gear 194 is driven with the shaft 193 during the downward movement of the bar 189, but is held stationary during the upward movement thereof.

Referring to Fig. 13, it will be noted that the gear 194 drives a gear 197 which is secured to a shaft 198. A number wheel 200 whose periphery is graduated into ten equal spaces and numbered from one to ten is also secured to the shaft 198. Since the gears 194 and 197 are each provided with the same number of teeth, it is apparent that the number wheel 200 will make one complete revolution and register ten with each revolution of the driving gear 194.

The counter 185 may be adjusted to count by multiples of any desired number by varying the length of the stroke of the bar 189. This is accomplished by a pair of lock nuts 202, 202 which are threaded on the upper portion of the bar 189 and serve to limit the downward movement thereof by engaging the top of the bearing 190 (Figs. 12 and 13). A compression spring 203 interposed between the bottom of the bearing 190 and a lug 204 formed integral with the bar 189 serves to return the bar 189 upwardly to its normal position after each actuation of the solenoid 186.

In the present embodiment of the invention, mechanism is provided for handling five strands at a time and the counter is adjusted to count in multiples of five. The downward stroke of the bar 189 is so adjusted that during each actuation of the solenoid 186 the pinion 192 together with the gear 194 will make one-half of a revolution, thereby causing the counter to register in multiples of five.

Figure 15:
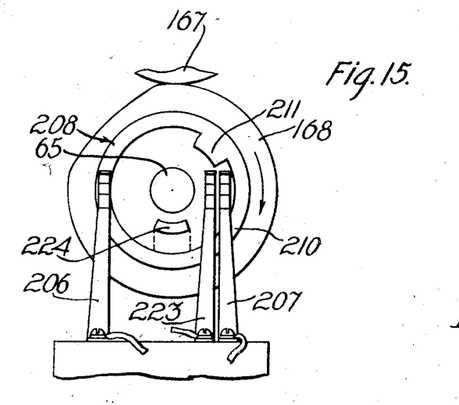
Fig. 15 is an enlarged fragmentary detail view of the contact clip arrangement which controls the actuation of the solenoids for operating the counter and tripping the collecting apron.

The circuit 187 which actuates the solenoid 186 is controlled by a pair of spring contact clips 206 and 207 which are adapted to constantly engage the face of an annular commutator member 208 (Figs. 15 and 17). The member 208 is secured at the forward end of the shaft 65 and is composed of any suitable insulating material, preferably hard rubber. Encircling the member 208 is a metal rim 210 which is constantly engaged by the contact brush 206. Positioned on the face of the member 208 just inside of the rim 210 and electrically connected therewith is a metal segment 211 with which the contact brush 207 is adapted to make a momentary contact during each revolution of the member 208, thereby closing the circuit 187 which actuates the solenoid 186 causing it to operate the counter. A switch 212 connected in the circuit 187 is opened while cutting off the ends of the strands before starting the machine into operation in order to render the counter ineffective.

The mechanism for tripping the collecting apron 180 to discharge the strands therefrom, after a predetermined number have been collected, will now be described. Pivotally connected at one end to a lug 214 projecting from the bottom of the apron 180 is a horizontal link 215, the other end of which is pivotally connected to the plunger 216 of a solenoid 218 (Fig. 5). The solenoid 218 is mounted on an insulating block 219 supported on the top of the bench 16 and is actuated by an electrical circuit 220 (Fig. 17). While the machine is in operation the circuit 220 is normally open at two points, one opening being controlled by a contact member 222 (Figs. 14 and 17) and the other opening being controlled by a contact brush 223 cooperating with a metal segment 224 positioned on the face of the commutator member 208 and electrically connected to the metal rim 210 (Fig. 15). The contact member 222 is controlled by the counting mechanism 185 and comprises two electrical contacts 225 and 226 which are normally separated from each other while the machine is in operation. The contact 225 is carried at the free end of a leaf spring 227 which is suitably secured at its other end to an insulating block 228 (Fig. 14). The contact 226 is suitably secured to and insulated from the side wall of a housing 229 enclosing the entire counting mechanism.

The counting mechanism 185 may be adjusted to close the contacts 225 and 226 after any predetermined number of strands have been severed and collected in the apron 180. In the present embodiment of the invention mechanism is provided for closing the circuit 220 to actuate the solenoid 218 and trip the collecting apron 180 after one hundred strands have been collected therein. The counter 185 is provided with a number wheel 230 (Figs. 14 and 17) which is geared to make one complete revolution while one hundred strands are severed and collected in the apron 180. The leaf spring 227 constantly engages the periphery of the number wheel 230 and is swung to the right to close the contacts 225 and 226, as shown in Fig. 14, by a knob or projection 231 which is adjustably positioned along the periphery of the number wheel 230.

As hereinbefore mentioned the contact member 222 controls only one of two openings in the circuit 220, the other opening being controlled by the contact brush 223 and the metal contact member 224 positioned on the face of the commutator member 208. It will be noted, however, that during each complete revolution of the member 208 a momentary contact is effected between the contact brush 223 and the contact member 224. The contact member 224 is so positioned that the drum 30 will have returned to its normal position before contact is made with the member 223. This is to insure that the tripping of the collecting apron 180 will not take place simultaneously with the discharging of the severed strands by the rotation of the drum 30.

Positioned at the forward end of the machine is an automatic stop mechanism 235 (Fig. 4) which serves to stop the driving motor when it encounters a knot or other irregularity in any of the strands approaching the capstan 23. The mechanism 235 comprises a comb like member 236 which is pivotally supported by brackets 237, 237 mounted on the forward end of the bench 16. Extending upwardly from the member 236 are a plurality of equi-distantly spaced teeth 238, 238 between which the strands pass from the supply source to the capstan 23. Projecting downwardly from the member 236 is a lug 239 at the end of which is pivoted a pin 243. An arm 241 is pivotally supported at one end near the bottom of the bracket 237 and has formed integral therewith intermediate its ends an upwardly projecting pin 242. Encircling the pins 243 and 242 and interposed between the arm 241 and an enlarged portion 244 of the pin 243 is a compression spring 245 which serves to normally hold the free end of the arm 241 in engagement with a push button 246 which operates a switch for controlling the driving power of the apparatus.

The operation of the above described apparatus is as follows: The number 113 is positioned at a predetermined distance from the cutting mechanism 60 in accordance with the desired length of the severed strands. The ends of strands from any suitable supply sources are threaded between the teeth 238 of the member 236, around the capstan 23, one in each groove 24 thereof, through the guide member 28 and past the stationary cutting blade 61. The switches 137 and 212 which control the circuits 112 and 187, respectively, are opened and the capstan 23 and belt 40 are caused to be driven through the main shaft 17. Since the relay circuit 112 is already opened, it is apparent that the cutting mechanism 60 will operate immediately to cut off the ends of the strands evenly and the drum 130 will be simultaneously rotated to discharge the severed ends into the collecting tray 180. The counter 185 is inoperative by the rotation of the drum at this time since the circuit 187 is open at the switch 212. After the ends of the strands have been cut off evenly, the switches 137 and 212 are closed causing the counter 185 to be brought into play and causing the operation of the cutting, counting, and tripping mechanisms to be thereafter controlled by the contact member 113 actuated by the forward ends of the moving strands.

What is claimed is:

1. In an apparatus for severing a strand into lengths, a guideway, a continuously moving belt for moving the strand along said guideway, a strand severing mechanism, means adjustably positioned along the guideway and actuated by the moving strand for controlling the operation of said severing mechanism, and means for moving the guideway to discharge the severed strand therefrom.

2. In an apparatus for severing a strand into lengths, a rotatable member having a plurality of guideways, means for moving the strand along one of said guideways, a strand severing mechanism, means adjustably positioned along the rotatable member and actuated by the moving strand for controlling the operation of said severing mechanism, means controlled by the strand for moving the severing mechanism in the same direction as the moving strand, and means for indexing the rotatable member to discharge the severed strand therefrom and present another guideway for the succeeding strand.

3. In an apparatus for severing a strand into lengths, a rotatable member having a guideway, a continuously moving belt for moving the strand along said guideway, said belt having a strand engaging portion provided with a depression disposed at an angle to the moving strand for holding the strand within said guideway, a strand severing mechanism, means actuated by the moving strand for operating said severing mechanism, means for indexing the rotatable member to discharge the severed strands therefrom, a member for collecting the severed strand, and mechanism for automatically counting the severed strands during the severing operation.

4. In an apparatus for severing a strand into lengths, a multi-sided member, a continuously moving belt for moving the strand along a side of said member, a strand severing mechanism, means actuated by the moving strand for controlling the operation of said severing mechanism, and means for simultaneously lowering and indexing the multi-sided member to discharge the severed strands therefrom.

5. In an apparatus for severing a strand into lengths, a rotatable member having a guideway, means for moving the strand along said guideway, a strand severing mechanism, an electric circuit including a source of current and means for actuating said severing mechanism, mechanism actuated by the moving strand for controlling said circuit, and means for simultaneously lowering and indexing the rotatable member to discharge the severed strand therefrom.

6. In an apparatus for severing a strand into lengths, a rotatable member having a guideway, means for moving the strand along said guideway, a strand severing mechanism, an electric circuit including a source of current and means for actuating said severing mechanism, mechanism actuated by the moving strand for controlling said circuit, means for indexing the rotatable member to discharge the severed strand therefrom, a member for collecting the severed strands, mechanism for counting the severed strands as they are received by said collecting member, an electric circuit including a source of current and means for actuating said counting mechanism, and means actuated by the rotatable member for controlling said last-mentioned circuit.

7. In an apparatus for severing a strand into lengths, a rotatable member having a guideway, means for moving the strand along said guideway, a strand severing mechanism, an electric circuit including a source of current and means for actuating said severing mechanism, mechanism actuated by the moving strand for controlling said circuit, means for indexing the rotatable member to discharge the severed strand therefrom, a member for collecting the severed strands, mechanism for counting the severed strands as they are received by said collecting member, an electric circuit including a source of current and means for actuating said counting mechanism, means actuated by the rotatable member for controlling said last-mentioned circuit, mechanism for tripping the collecting member to discharge the severed strands therefrom, an electric circuit including a source of current and means for actuating said tripping mechanism, and means actuated by the counting mechanism for controlling said last-mentioned circuit.

8. In an apparatus for severing a strand into lengths, a stationary blade, a rotatable member, a blade carried thereby, said blade positioned at an angle to the stationary blade, means for advancing a strand, means controlled by the strand for rotating the member and simultaneously moving it in the some direction as the advancing strand, and means for causing the movable blade to be positioned parallel to the stationary blade during engagement therewith.

In witness whereof, I hereunto subscribe my name this 26th day of January A. D., 1925.

FREDERIC SHIELDS KOCHENDORFER.